United States Patent
Kwon et al.

(10) Patent No.: US 11,316,232 B2
(45) Date of Patent: Apr. 26, 2022

(54) COMPOSITE SEPARATOR, METHOD OF PREPARING THE SAME, AND SECONDARY BATTERY INCLUDING THE SAME

(71) Applicant: Samsung Electronics Co., Ltd., Suwon-si (KR)

(72) Inventors: Boksoon Kwon, Suwon-si (KR); Youngsuk Jung, Suwon-si (KR); Seungrim Yang, Seongnam-si (KR); Dongsu Ko, Seoul (KR); Youngnam Kwon, Suwon-si (KR); Hyoungwoo Choi, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 666 days.

(21) Appl. No.: 15/972,769

(22) Filed: May 7, 2018

(65) Prior Publication Data
US 2019/0148698 A1 May 16, 2019

(30) Foreign Application Priority Data
Nov. 16, 2017 (KR) .................. 10-2017-0153313

(51) Int. Cl.
*H01M 50/449* (2021.01)
*H01M 10/0525* (2010.01)
(Continued)

(52) U.S. Cl.
CPC ..... *H01M 50/449* (2021.01); *H01M 10/0525* (2013.01); *H01M 50/403* (2021.01);
(Continued)

(58) Field of Classification Search
CPC .. H01M 2/1666; H01M 2/162; H01M 2/1653; H01M 2/1613
See application file for complete search history.

(56) References Cited

U.S. PATENT DOCUMENTS 5,346,788 A * 9/1994 Chang ............... H01M 2/14
429/249
5,800,939 A * 9/1998 Mishina ............ H01M 10/0468
429/57
(Continued)

FOREIGN PATENT DOCUMENTS

JP 3756815 B2 3/2006
JP 2014049416 A 3/2014
(Continued)

OTHER PUBLICATIONS

C. Liu et al., 'Review of progress in shape-memory polymers' *Journal of Materials Chemistry*, vol. 17, Mar. 2007, pp. 1543-1558.
(Continued)

*Primary Examiner* — Maria Laios
(74) *Attorney, Agent, or Firm* — Harness, Dickey & Pierce, P.L.C.

(57) ABSTRACT

A composite separator, a method of preparing the composite separator, and a secondary battery including the composite separator are provided. The composite separator includes a heat-resistant nonwoven fabric, and a porous coating film on at least one surface of the heat-resistant nonwoven fabric and including a multi-phase polymer including a stationary phase segment and a reversible phase segment, wherein an amount of the stationary phase segment is larger than an amount of the reversible phase segment.

20 Claims, 10 Drawing Sheets

(51) Int. Cl.
 *H01M 50/44* (2021.01)
 *H01M 50/403* (2021.01)
 *H01M 50/411* (2021.01)
 *H01M 50/431* (2021.01)

(52) U.S. Cl.
 CPC ......... *H01M 50/411* (2021.01); *H01M 50/44* (2021.01); *H01M 50/431* (2021.01); *H01M 2220/20* (2013.01)

(56) References Cited

U.S. PATENT DOCUMENTS

| | | | |
|---|---|---|---|
| 6,723,467 B2 | 4/2004 | Yoshida et al. | |
| 9,142,815 B2 | 9/2015 | Lee | |
| 9,422,964 B2 | 8/2016 | Rule et al. | |
| 9,559,345 B2 | 1/2017 | Yoon et al. | |
| 2004/0043296 A1* | 3/2004 | Lithium | H01M 4/13 429/306 |
| 2013/0017431 A1 | 1/2013 | Frisk et al. | |
| 2013/0224557 A1* | 8/2013 | Hayakawa | H01M 50/449 429/144 |
| 2013/0224559 A1* | 8/2013 | Furutani | H01M 50/403 429/145 |
| 2014/0255792 A1* | 9/2014 | Cao | H01M 50/0525 429/303 |
| 2018/0292746 A1 | 10/2018 | Miyagi et al. | |

FOREIGN PATENT DOCUMENTS

| | | |
|---|---|---|
| JP | 101407770 B1 | 7/2014 |
| KR | 2005033014 A | 2/2005 |
| KR | 2010/0030996 A | 3/2010 |
| KR | 20100112842 A | 10/2010 |
| KR | 2011/0059990 A | 6/2011 |
| KR | 101055536 B1 | 8/2011 |
| KR | 101235172 B1 | 2/2013 |

OTHER PUBLICATIONS

B. Yang et al., 'Effects of moisture on the glass transition temperature of polyurethane shape memory polymer filled with nano-carbon powder' *European Polymer Journal*, vol. 41, 2005, pp. 1123-1128.
Shape Memory Polymer SMP Technologies, http://www2.smptechno.com/en/smp/, accessed Dec. 16, 2019.

* cited by examiner ated from the description, or may be learned by practice

COMPOSITE SEPARATOR, METHOD OF PREPARING THE SAME, AND SECONDARY BATTERY INCLUDING THE SAME

CROSS-REFERENCE TO RELATED APPLICATION

This application claims the benefit of priority from Korean Patent Application No. 10-2017-0153313, filed on Nov. 16, 2017, in the Korean Intellectual Property Office, the disclosure of which is incorporated herein in its entirety by reference.

BACKGROUND

1. Field

Example embodiments relate to a composite separator, a method of preparing the composite separator, and/or a secondary battery including the composite separator.

2. Description of the Related Art

With the increasing capacity of secondary batteries, their application fields are also expanding to high-capacity devices such as power sources of electric vehicles or electric power storage systems. Such applications may raise safety issues in connection with the manufacture and use of such batteries.

As a separator for a secondary battery, a polyethylene separator is typically used. A polyethylene separator has typically good electrochemical stability and mechanical strength, but may have insufficient electrolyte wettability and unsatisfactory thermal stability, which are obstacles to the application of such high-capacity, high-output secondary batteries. To address these drawbacks, coating ceramic particles or a binder polymer on a surface of the polyethylene separator may be used. However, this method may have drawbacks related to the low melting point of the polyethylene itself.

SUMMARY

Example embodiments relate to a composite separator.

Example embodiments relate to a method of preparing the composite separator.

Example embodiments relate to a secondary battery including the composite separator, the secondary battery exhibiting improved performance compared to a secondary battery that does not include the composite separator.

Additional example embodiments will be set forth in part in the description which follows and, in part, will be apparent from the description, or may be learned by practice of the example embodiments.

According to an example embodiment, a composite separator may include a heat-resistant nonwoven fabric and a porous coating film on at least one surface of the heat-resistant nonwoven fabric and including a multi-phase polymer including a stationary phase segment and a reversible phase segment, wherein an amount of the stationary phase segment is larger than an amount of the reversible phase segment.

According to an example embodiment, a method of preparing the above-described composite separator includes coating, on at least one surface of the heat-resistant nonwoven fabric, a composition for forming the porous coating film, the composition including the multi-phase polymer including the stationary phase segment and the reversible phase segment, and a solvent. The method also includes contacting, with a non-solvent, the heat-resistant nonwoven fabric coated with the composition for forming the porous coating film, to thereby induce phase transition.

According to an example embodiment, a secondary battery includes a positive electrode, a negative electrode, and the above-described composite separator between the positive electrode and the negative electrode.

BRIEF DESCRIPTION OF THE DRAWINGS

These and/or other example embodiments will become apparent and more readily appreciated from the following description taken in conjunction with the accompanying drawings in which.

DETAILED DESCRIPTION

Figure 1A:
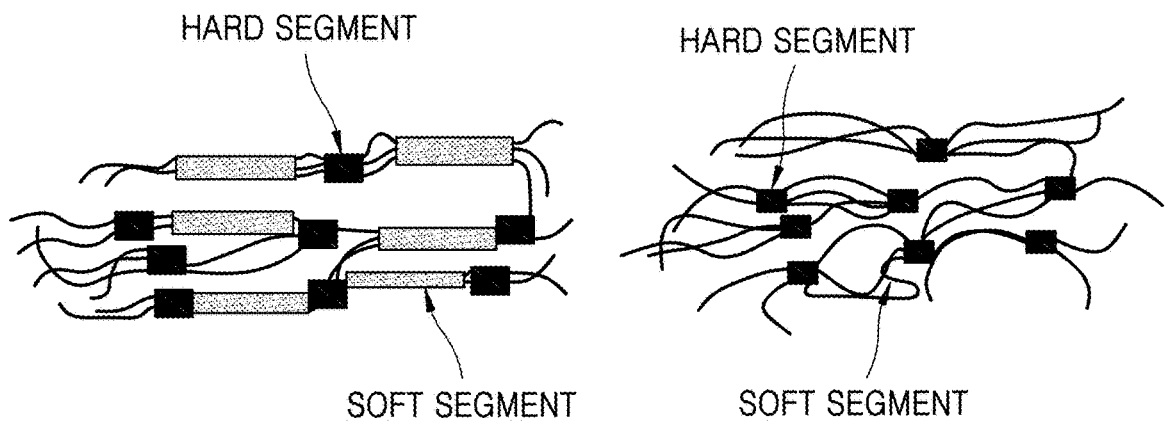
FIG. 1A is a schematic view illustrating a structure of polyurethane as a multi-phase polymer, according to an example embodiment.

Reference will now be made in detail to example embodiments illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments of a composite separator, a method of preparing the composite separator, and a secondary battery including the composite separator will be described in greater detail.

In accordance with example embodiments, a composite separator includes a heat-resistant nonwoven fabric, and a porous coating film that is on at least one surface of the heat-resistant nonwoven fabric and contains a multi-phase polymer including a stationary phase segment and a reversible phase segment, wherein an amount of the stationary phase segment is larger than an amount of the reversible phase segment.

When a battery is overheated, a general separator may have a shutdown function and configured to block migration of ions by shutting down pores thereof at a melting temperature of composite materials and also hinder or prevent an internal short circuit, e.g., a contact between positive and negative electrodes, caused from melting of the general separator at a temperature higher than a shutdown temperature, thereby inhibiting ignition or explosion of the battery.

The multi-phase polymer may refer to a 2-phase polymer including a reversible phase segment and a stationary phase segment, wherein the reversible phase segment may refer to a segment that undergoes a change from a glass phase to a melted phase or rubbery phase by external stimuli such as heat, and the stationary phase segment may refer to a segment that serves as a thermally stable crosslinking site with no thermal change.

For example, the multi-phase polymer may be at least one of a polymethyl methacrylate-polybutylene methacrylate copolymer, a fish oil polymer, a soybean oil-styrene-divinylbenzene copolymer, and a shape-memory polyurethane. The multi-phase polymer may have a glass transition temperature of about 100° C. and shape-memory polymer characteristics.

In the multi-phase polymer, the amount of the stationary phase segment may affect phase separation of the stationary phase segment and the reversible phase segment. When the amount of the stationary phase segment is larger than the amount of the reversible phase segment, the multi-phase polymer may have improved thermal and mechanical stability characteristics.

In the multi-phase polymer, the amount of the stationary phase segment may be about 70 wt % to about 85 wt %, and in some example embodiments, about 72 wt % to about 80 wt %, and in some other example embodiments, about 73 wt % to about 78 wt %, based on a total amount of the stationary phase segment and the reversible phase segment. The amount of the multi-phase polymer may be about 10 wt % to about 30 wt % based on a total weight of the composite separator.

In the composite separator according to one or more example embodiments, shutdown of pores may occur at a temperature lower than a shutdown temperature of about 130° C. to 140° C. of polyethylene at which pore shutdown occurs due to melting of polyethylene, and thus the composite separator may be improved in terms of safety. The composite separator may have a rapid shutdown rate due to a high resistance increase slope. The composite separator may have an increased meltdown temperature, and thus maintain its shape at a temperature of about 150° C. or greater.

The composite separator according to one or more example embodiments may include a porous coating film on the heat-resistant nonwoven fabric having good thermal resistance, the porous coating film containing a multi-phase polymer in two phases including a stationary phase segment and a reversible phase segment. A glass transition temperature of the multi-phase polymer may provide the composite separator a shutdown function blocking migration of ions by shutting down pores, which lacks in heat-resistant nonwoven fabric. In addition, the stationary phase segment of the multi-phase polymer, for example, a hard segment of polyurethane, which will be described later, may serve as a thermally stable crosslinking site with no thermal change at a high temperature, and thus hinder or prevent the composite separator from melting down. In addition, the composite separator may be designed to have any various transition temperatures by changing the contents, lengths, and mixing ratio of the soft segment and the hard segment (or mixing ratio of the reversible phase and stationary phase).

Reaction Scheme 1 illustrates a process of preparing polyurethane as a multi-phase polymer according to an example embodiment.

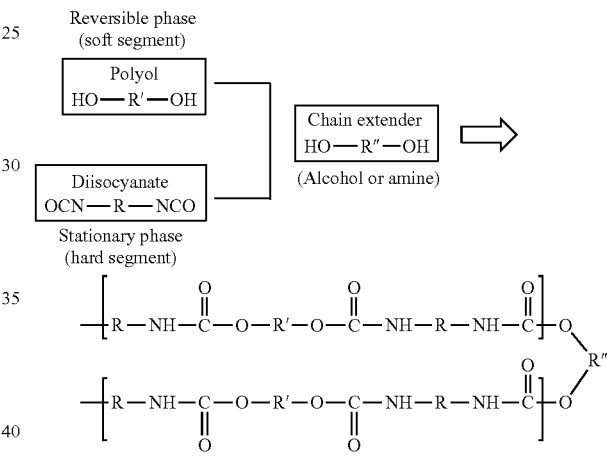

In Reaction Scheme 1, R, R', and R" are independently selected from a substituted or unsubstituted C1-C30 alkylene group, a substituted or unsubstituted C2-C30 alkenylene group, a substituted or unsubstituted C2-C30 alkynylene group, a substituted or unsubstituted C6-C30 arylene group, a substituted or unsubstituted C2-C30 heteroarylene group, or a substituted or unsubstituted C4-C30 carbocyclic group.

Referring to Reaction Scheme 1, polyurethane may be prepared by reacting polyol and diisocyanate, which constitute reversible phase (soft) segment and the stationary phase (hard) segment, respectively, to obtain a polyurethane prepolymer and then adding a chain extender to react the chain extender with the polyurethane prepolymer. The chain extender may variously control the glass transition temperature of the composite separator.

As an example embodiment of the multi-phase polymer, polyurethane according to an example embodiment, as a shape-memory polymer, may have the ability to change its shape within a short time. Using the porous coating film including polyurethane as a shape-memory polymer, together with the heat-resistant nonwoven fabric, rapid shutdown of pores in a narrow transition temperature range, and consequently a rapid resistance increase, may be ensured in the battery. In addition, due to a high glass transition temperature of the stationary phase segment, the composite separator may maintain its shape even when exposed to a high temperature after shutdown, and may maintain its integrity, thus effectively hindering or preventing an internal short circuit.

FIG. 1A is a schematic view illustrating a structure of polyurethane as an example of a multi-phase polymer, according to an example embodiment, provided to explain the principle of reaction to heat. The polyurethane may include a hard segment and a soft segment.

The soft segment of the polyurethane is a unit derived from polyol having a low glass transition temperature or a low melting temperature, which corresponds to the reversible phase segment of the multi-phase polymer. The hard segment of the polyurethane is a unit derived from semicrystalline aromatic diisocyanate having a high glass transition temperature or a high melting temperature, which corresponds to the stationary phase segment of the multi-phase polymer.

The hard segment may form a rigid crystalline lattice due to strong hydrogen bonding between urethane bonds and interaction between benzene rings, and form a 3-dimensional network structure by physical crosslink bonding, resulting in a discontinuous phase. This may hinder or prevent slippage between molecular chains when stretched, imparting stability, elasticity, or the like to the polyurethane. When stretched, molecular chains of the soft segment in a random coil state may become linear and elongated. When the stretching force is removed, the soft segment may return to its original length due to entropic elasticity.

In some example embodiments, the composite separator may have improved thermal/mechanical stability when the molecular weight of the stationary phase segment of the polyurethane and a ratio of the reversible phase segment and the soft segment, e.g., a ratio of the hard segment to the soft segment, are controlled.

Factors affecting the physical properties and glass transition temperature of the polyurethane are, for example, types and a mixing ratio of diisocyanate, polyol, and the chain extender, a thermal treatment temperature, and the like.

For example, the polyurethane may be prepared as follows.

First, a polyurethane prepolymer may be formed from a mixture of diisocyanate and polyol in a certain ratio. Since the reaction of forming the polyurethane prepolymer may be an exothermic reaction, the reaction container may be cooled and maintained at about 50° C. or less.

After termination of the reaction, a chain extender may be added to the reaction product, followed by degassing. Then, the resulting product may be placed in a dry oven (25° C.) for about 1 to 2 days and then heated at about 80° C. to 100° C. to induce crosslinking reaction, thereby obtaining the polyurethane.

The composite separator may be prepared using a three-phase transition film formation method. The porous coating film of the composite separator may be obtained by coating a composition for forming the porous coating film on the heat-resistant nonwoven fabric, the composition including the multi-phase polymer and a solvent, and dipping a resulting coated product in a non-solvent to induce phase transition.

In the composition for forming the porous coating film, an amount of the multi-phase polymer may be varied depending on the physical properties of the multi-phase polymer (e.g., a weight average molecular weight, a mixed ratio of the stationary phase segment and the reversible phase segment, etc.). For example, the amount of the multi-phase polymer may be about 10 wt % to about 90 wt %, and in some example embodiments, about 15 wt % to about 25 wt %, based on a total weight of the composition. The porous coating film may be formed of or include the multi-phase polymer only, without a binder, through the above-described three-phase transition film formation method. In the three-phase transition film formation method, as the sample (nonwoven fabric) coated with the composition is dipped in deionized water, the solvent may be slowly released from the coated layer, causing phase transition, resulting in the porous coating film including the multi-phase polymer coated on the nonwoven fabric. The porous coating film thus obtained was found to include pores according to surface and cross-sectional views.

A porous structure of the porous coating film may vary depending on the amount of the multi-phase polymer in the composition for forming the porous coating film, the composition including the multi-phase polymer and a solvent, as well as the conditions of contacting the coated product with the non-solvent, the thickness of the heat-resistant nonwoven fabric, porosity, or the like.

For example, the time of contact between the coated product and the non-solvent may be about 5 minutes to about 100 minutes, and in some example embodiments, about 5 minutes to about 20 minutes. When the time of contact between the coated product and the non-solvent is within these ranges, the composite separator may have a porosity of about 25% to about 60%.

Before the contacting of the coated product and the non-solvent, a first-order phase transition process may be further performed by injecting an inert gas, for example, a nitrogen gas. Through this additional first-order phase transition process, uniformity characteristics in size and distribution of pores may be further improved.

When the porous coating film is obtained by mixing a multi-phase polymer, a binder and a solvent to prepare a composition, coating the composition on the nonwoven fabric, and then drying a coated product, the obtained porous coating film may include the multi-phase polymer and the binder. In this case, the porous coating layer including the binder, which may serve as a resistor, may have increased resistance, compared to the porous coating film according to an example embodiment formed using a three-phase transition method as described above.

In the composite separator according to one or more example embodiments, the multi-phase polymer may be a polyurethane having a glass transition temperature of about 50° C. or greater, and in some example embodiments, about 55° C. to about 150° C., and in some other example embodiments, about 55° C. to about 90° C. The multi-phase polymer may be, for example, a ether-based polyurethane having a glass transition temperature of about 50° C. or greater, for example about 55° C. to about 110° C.

The multi-phase polymer may be a product obtained by adding a chain extender to a reaction product of bifunctional aromatic diisocyanate and bifunctional polyol so as to undergo a reaction therewith. The bifunctional polyol may be, for example, bifunctional polyether polyol.

For example, an amount of the bifunctional aromatic diisocyanate may be about 1.1 moles to about 5.0 moles with respect to 1 mole of the bifunctional polyol. An amount of the chain extender may be about 4.0 moles or less, and in some example embodiments, about 0.01 moles to about 4.0 moles, and in some other example embodiments, about 0.1 moles to about 1.0 mole, with respect to 1 mole of the bifunctional polyol. For example, the amount of the chain extender may be about 0.1 moles to about 1.5 moles with respect to 1 mole of the polyurethane prepolymer. When the amounts of the bifunctional aromatic diisocyanate, the polyol, and the chain extender are within these ranges, a polyurethane may be prepared in which an amount of the stationary phase segment is larger than an amount of the reversible phase segment. The bifunctional aromatic diisocyanate may be, for example, at least one selected from diphenylmethane-4,4'-diisocyanate, 2,4-toluene diisocyanate, and carbodiimide-modified diphenylmethane-4,4-diisocyanate.

The bifunctional polyol may have a weight average molecular weight of about 5000 Daltons or less, and in some example embodiments, about 1000 Daltons to about 5000 Daltons, and in some other embodiments, about 2500 Daltons to about 4500 Daltons.

In some example embodiments, the bifunctional) polyol may be polyetherpolyol, polyesterpolyol, or the like. For example, the bifunctional polyol may be polyetherpolyol. For example, the bifunctional) polyol may be at least one selected from glycerol, polypropylene glycol, 1,4-butane glycol adipate, polytetramethylene glycol, ethylene glycol, polyethylene glycol, and a propylene oxide adduct of bisphenol A.

The chain extender may be, for example, at least one selected from, 1,4-butanediol, bis(2-hydroxyethyl)hydroquinone, an ethylene oxide adduct of bisphenol A, and a Bisphenol A-propylene oxide adduct.

The multi-phase polymer may be, for example, MS5520, MM5520, or MM9020, which are commercially available from SMP.

The multi-phase polymer may be, for example, i) a polyurethane obtained using diphenylmethane-4,4'-diisocyanate, adipic acid, ethylene glycol, ethylene oxide, polypropylene oxide, 1,4-butanediol, and Bisphenol A; or ii) a polyurethane obtained from methylene diphenyl isocyanate and polyol.

The heat-resistant nonwoven fabric may have a melting temperature (Tm) of about 200° C. or greater, an air permeability of about 50 cc/cm²·sec to about 250 cc/cm²·sec, a thickness of about 10 µm to about 25 µm, and an average pore size of about 0.1 µm to about 1.0 µm. The heat-resistant nonwoven fabric may be at least one nonwoven fabric selected from polyester, polyetherimide, polyethylene, polypropylene, polyethylene terephthalate, polybutylene terephthalate, polyamide, polyacetal, polycarbonate, polyimide, polyether ketone, polyethersulfone, polyphenylene oxide, polyphenylene sulfide, polyethylene naphthalene, polytetrafluoroethylene, polyfluorinated vinylidene, polyvinyl chloride, polyacrylonitrile, cellulose, nylon, polyparaphenylene benzobisoxazole, polyarylate, and glass, The composite separator may have a storage modulus slope of about 30 MPa/° C. or greater, for example, about 50 MPa/° C. to about 100 MPa/° C., as measured by dynamic mechanical analysis (DMA) at a temperature of about 100° C. or less. When the storage modulus slope of the composite separator is within these ranges, the composite separator may have a rapid shutdown rate and a uniform reaction over the entire area of the composite separator may be ensured.

The composite separator may have a pore shutdown temperature of about 70° C. to about 150° C. and a meltdown temperature of about 200° C. to about 300° C.

The porous coating film may have a thickness of about 5 to 30 µm, for example about 10 µm to about 20 µm.

The composite separator may have a porosity of about 25% to about 60% and an air permeability of about 1 sec/100 cc to about 100 sec/100 cc.

The multi-phase polymer may have a weight average molecular weight of about 5,000 Daltons to about 300,000 Daltons. When the multi-phase polymer has a weight average molecular weight within this range, the composite separator may have improved safety and rigidity. The weight average molecular weights referred to herein may be measured using gel permeation chromatography.

In accordance with example, a method of preparing the composite separator according to any of the above-described example embodiments includes coating, on at least one surface of a heat-resistant nonwoven fabric, a composition for forming a porous coating film, the composition including a multi-phase polymer including a stationary phase segment and a reversible phase segment, and a solvent, and contacting the heat-resistant nonwoven fabric coated with the composition for forming the porous coating film with a non-solvent to induce phase transition. In this preparation method of the composite separator, preparation costs are low and the overall preparation processes are simple.

The method may further include wetting the heat-resistant nonwoven fabric with a solvent, before the coating of the composition for forming the porous coating film on the at least one surface of the heat-resistant nonwoven fabric.

The solvent may be at least one selected from N,N-dimethylformamide, dimethylsulfoxide, N-methyl-2-pyrrolidone, 1,4-dioxane, and tetrahydrofuran. The non-solvent may be at least one selected from water and alcohol.

In accordance with another example embodiment, a secondary battery includes a positive electrode, a negative electrode, and the composite separator according to any of the example embodiments between the positive and negative electrodes.

The secondary battery may be, for example, a lithium secondary battery, a sodium secondary battery, or a magnesium secondary battery. The lithium secondary battery is not limited to a specific form, and may have any form. For example, the lithium secondary battery may be a lithium ion battery, a lithium ion polymer battery, a lithium sulfur battery, or the like.

Hereinafter, a lithium secondary battery as an example embodiment of the secondary battery will be described.

A lithium secondary battery may include a positive electrode, a negative electrode, a separator between the positive and negative electrodes, and an electrolyte.

A positive active material for forming the positive electrode may further include at least one selected from a lithium cobalt oxide, a lithium nickel cobalt manganese oxide, a lithium nickel cobalt aluminum oxide, a lithium iron phosphate oxide, and a lithium manganese oxide. However, embodiments are not limited thereto, and any positive active material available in the art may be used.

For example, the positive active material may be a compound represented by one of the following formula: $Li_aA_{1-b}B_bD_2$ (wherein $0.90 \leq a \leq 1$, and $0 \leq b \leq 0.5$); $Li_aE_{1-b}B_bO_{2-c}D_c$ (wherein $0.90 \leq a \leq 1$, $0 \leq b \leq 0.5$, and $0 \leq c \leq 0.05$); $LiE_{2-b}B_bO_{4-c}D_c$ (wherein $0 \leq b \leq 0.5$, and $0 \leq c \leq 0.05$); $Li_aNi_{1-b-c}Co_bB_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein 0.90≤a≤1, and 0.001≤b≤0.1); $Li_aCoG_bO_2$ (wherein 0.90≤a≤1, and 0.001≤b≤0.1); $Li_aMnG_bO_2$ (wherein 0.90≤a≤1, and 0.001≤b≤0.1); $Li_aMn_2G_bO_4$ (wherein 0.90≤a≤1, and 0.001≤b≤0.1); $QO_2$; $QS_2$; $LiQS_2$; $V_2O_5$; $LiV_2O_5$; $LiIo_2$; $LiNiVO_4$; $Li_{(3-f)}J_2(PO_4)_3$ (wherein 0≤f≤2); $Li_{(3-f)}Fe_2(PO_4)_4$ (wherein 0≤f≤2); and $LiFePO_4$.

In these formulae, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The positive active material may be, for example, a compound represented by Formula 1, a compound represented by Formula 2, or a compound represented by Formula 3.

$$Li_aNi_bCo_cMn_dO_2 \quad \text{[Formula 1]}$$

In Formula 1, 0.90≤a≤1.8, 0≤b≤0.9, 0≤c≤0.5, and 0≤d≤0.5.

$$Li_2MnO_3 \quad \text{[Formula 2]}$$

$$LiMO_2 \quad \text{[Formula 3]}$$

In Formula 3, M may be Mn, Fe, Co, or Ni.

The positive electrode may be prepared in the following manner.

A positive active material, a binder, and a solvent may be mixed to prepare a positive active material composition. A conducting agent may be further added to the positive active material composition.

The positive active material composition may be directly coated on a metal current collector and dried to manufacture a positive electrode. In some example embodiments, the positive active material composition may be cast on a separate support to form a film. This film may then be detached from the support and laminated on a metal current collector to manufacture a positive electrode.

In some example embodiments, a plasticizer may be further added into the positive active material composition and/or the negative active material composition to obtain a positive electrode having pores.

The amounts of the positive active material, the conducting agent, the binder, and the solvent may be as generally used in the manufacture of a secondary battery. At least one of the conducting agent, the binder, and the solvent may be omitted depending on the use and the structure of the lithium battery.

A negative electrode may be prepared in substantially the same manner as the above-describe preparation process of the positive electrode, except that a negative active material is used instead of the positive active material.

Examples of the negative active material may include a carbonaceous material, silicon, a silicon oxide, a silicon-based alloy, a silicon-carbonaceous material composite, tin, a tin-based alloy, a tin-carbon composite, a metal oxide, or a combination thereof.

The carbonaceous material may be crystalline carbon, amorphous carbon, or a mixture thereof. Examples of the crystalline carbon may include graphite such as natural graphite or artificial graphite in amorphous, disk-shaped, flake, spherical, or fibrous form. Examples of the amorphous carbon may include soft carbon (carbon sintered at low temperature), hard carbon, meso-phase pitch carbonization product, sintered cokes, graphene, carbon black, fullerene soot, carbon nanotubes, and carbon fibers. However, embodiments are not limited thereto. Any material available in the art may be used as the crystalline carbon or the amorphous carbon may be used.

The negative active material may be selected from Si, $SiO_x$ (wherein 0<x<2, for example, 0.5<x<1.5), Sn, $SnO_2$, a silicon-containing metal alloy, and a mixture thereof. The silicon-containing metal alloy includes Si at least one selected from Al, Sn, Ag, Fe, Bi, Mg, Zn, In, Ge, Pb, and Ti.

The negative active material may include a metal/metalloid alloyable with lithium, an alloy thereof, or an oxide thereof. For example, the metal/metalloid alloyable with lithium may be Si, Sn, Al, Ge, Pb, Bi, Sb, a Si—Y alloy (wherein Y may be an alkali metal, an alkali earth metal, a Group 13 element, a Group 14 element, a transition metal, a rare earth element, or a combination thereof; but not Si), a Sn—Y alloy (wherein Y may be an alkali metal, an alkali earth metal, a Group 13 element, a Group 14 element, a transition metal, a rare earth element, or a combination thereof; but not Sn), or $MnO_x$ (wherein 0<x≤2). Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, or a combination thereof. Examples of the oxide of the metal/metalloid alloyable with lithium are a lithium titanium oxide, a vanadium oxide, and a lithium vanadium oxide, $SnO_2$, and $SiO_x$ (wherein 0<x<2).

For example, as the negative electrode, a lithium negative electrode thin film may be used.

The amounts of the negative active material, the conducting agent, the binder, and the solvent may be as generally used in the manufacture of a secondary battery such as lithium secondary battery.

Next, as the separator between the positive electrode and the negative electrode, the composite separator according to any of the example embodiments may be prepared.

A lithium salt-containing non-aqueous electrolyte may be prepared. The lithium salt-containing non-aqueous electrolyte may include a non-aqueous electrolyte and a lithium salt. For example, the non-aqueous electrolyte may be a non-aqueous liquid electrolyte, an organic solid electrolyte, or an inorganic solid electrolyte.

For example, the non-aqueous liquid electrolyte may be an aprotic organic solvent, such as N-methyl-2-pyrrolidone, propylene carbonate, ethylene carbonate, butylene carbonate, dimethyl carbonate, diethyl carbonate, gamma-butyrolactone, 1,2-dimethoxyethane, tetrahydrofuran, 2-methyl tetrahydrofuran, dimethylsulfoxide, 1,3-dioxolane, formamide, dimethylformamide, acetonitrile, nitromethane, methyl formate, methyl acetate, phosphoric acid trimester, trimethoxymethane, a dioxolane derivative, sulfolane, methyl sulfolane, 1,3-dimethyl-2-imidazolidinon, a propylene carbonate derivative, a tetrahydrofuran derivative, ether, methyl propionate, ethyl propionate, or fluoroethylene carbonate (FEC).

Examples of the organic solid electrolyte may include a polyethylene derivative, a polyethylene oxide derivative, a polypropylene oxide derivative, a phosphate ester polymer, polyester sulfide, polyvinyl alcohol, polyvinylidene fluoride, and a polymer including an ionic dissociation group.

Examples of the inorganic solid electrolyte may include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be a material that may easily dissolve in the non-aqueous electrolyte. Examples of the lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, (FSO$_2$)$_2$NLi, lithium chloroborate, lower lithium aliphatic carbonate, and lithium tetrakis(phenyl)borate. To improve the charging/discharging characteristics and flame retardancy, the non-aqueous electrolyte may further include, for example, pyridine, triethylphosphate, triethanolamine, cyclic ether, ethylenediamine, n-glyme, hexamethyl phosphoamide, a nitrobenzene derivative, sulfur, quinone imine dye, N-substituted oxazolidinone, N,N-substituted imidazolidine, ethyleneglycol dialkylether, ammonium salt, pyrrol, 2-methoxy ethanol, or aluminum trichloride. In some embodiments, to impart non-flammability, a halogen-containing solvent such as carbon tetrachloride or ethylene trifluoride may be further added to the non-aqueous electrolyte.

Figure 1B:
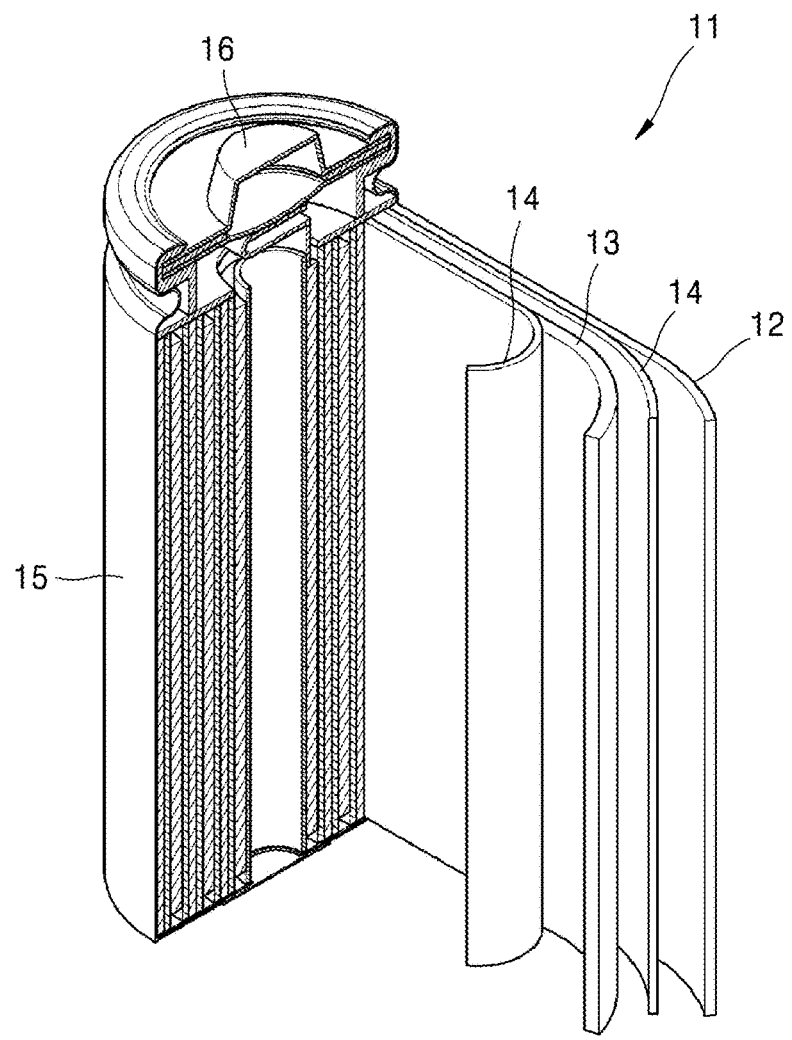
FIG. 1B is a schematic view illustrating a structure of a lithium secondary battery according to an example embodiment.

Referring to FIG. 1B, a lithium secondary battery 11 according to an example embodiment may include a positive electrode 13, a negative electrode 12, and a composite separator 14. The positive electrode 13, the negative electrode 12, and the composite separator 14 may be wound or folded, and then accommodated in a battery case 15. Then, the battery case 15 may be filled with an organic electrolyte solution and sealed with a cap assembly 16, thereby completing the manufacture of the lithium secondary battery 11. The battery case 15 may be of a cylindrical type, a rectangular type, or a thin-film type. For example, the lithium secondary battery 11 may be a thin-film type battery. The lithium secondary battery 11 may be a lithium ion battery.

The lithium secondary battery 11 may be a lithium ion battery having a charging voltage of about 4.0V or greater, for example, about 4.3V or greater.

The composite separator 14 may be between the positive electrode 13 and the negative electrode 12 to form a battery assembly. In some example embodiments, a plurality of battery assemblies may be stacked in a bi-cell structure and impregnated with an organic electrolyte solution. The resultant may be put into a pouch and sealed, thereby completing the manufacture of a secondary battery such as a lithium secondary battery). In some example embodiments, a plurality of battery assemblies may be stacked upon one another to form a battery pack. This battery pack may be used in any device that may benefit from high capacity and high output, for example, in a laptop computer, a smart phone, and an electric vehicle.

As described above, using the composite separator according to any of the above-described example embodiments, the lithium secondary battery may have enhanced stability. Due to the glass transition temperature of the composite separator having the multi-phase polymer-containing porous coating film on the heat-resistant nonwoven fabric, the composite separator may be configured to have a shutdown function due to having a wider range of glass transition temperatures, which is not found in a simple heat-resistant nonwoven fabric, and ensure safety of the secondary battery. Therefore, the composite separator according to any of the example embodiments may remarkably improve safety against heat when used in a secondary battery having high or increased capacity for use as a power source of electric vehicles or power storage systems. The composite separator in a secondary battery may have a rapid response to a 2-phase transition and heat, may be designed to have a wide range of transition temperatures, and may have improved heat resistance that is strong enough to maintain its shape against a high amount of heat. Therefore, the lithium secondary battery including the composite separator having the above-described characteristics may be applicable in an electric vehicle (EV), for example, in a hybrid vehicle such as a plug-in hybrid electric vehicle (PHEV).

One or more example embodiments will now be described in detail below. However, these examples are only for illustrative purposes and are not intended to limit the scope of the one or more embodiments.

EXAMPLE 1

Preparation of Composite Separator According to an Example Embodiment

A polyethylene terephthalate (PET) nonwoven fabric (having a thickness of about 18 μm and an air permeability of about 210 cc/cm$^2$·sec) used as a polyester nonwoven fabric was wetted with dimethylformamide (DMF). Then, the PET nonwoven fabric wetted with DMF was spin-coated with a porous coating film forming composition including 20 wt % of polyurethane (MS5520, available from SMP, a mixing weight ratio of stationary phase segment to reversible phase segment of 77:23, and a M$_W$ of 160,000 Daltons) and 80 wt % of DMF at a speed of about 1,500 rpm for about 30 sec, and then exposed to the air within 30 seconds. The resulting coated product was dipped into non-solvent deionized water in a container for about 24 hours and then dried at room temperature (25° C.), thereby preparing a composite separator having a porous coating film. During these processes, as the solvent DMF slowly flowed off, causing phase transition, the composite separator including the multi-phase polymer MS5520 coated on the polyester nonwoven fabric was obtained. The composite separator prepared according to Example 1 had a total thickness of about 24 μm and a structure including the porous coating film on the polyester nonwoven fabric.

EXAMPLE 2

Preparation of Composite Separator According to an Example Embodiment

A composite separator was prepared in the same manner as in Example 1, except that a porous coating film forming composition including 15 wt % of MM9020 (available from SMP, a M$_W$ of about 87,000 Daltons) (a mixing weight ratio of stationary phase segment to reversible phase segment of about 73:27) and 85 wt % of DMF was used.

EXAMPLE 3

Preparation of Composite Separator According to an Example Embodiment

A composite separator was prepared in the same manner as in Example 1, except that a porous coating film forming composition including about 10 wt % of MS5520 and about 90 wt % of DMF was used.

EXAMPLE 4

Preparation of Composite Separator According to an Example Embodiment

A composite separator was prepared in the same manner as in Example 1, except that a porous coating film forming composition including about 30 wt % of MS5520 and about 70 wt % of DMF was used.

EXAMPLE 5

Preparation of Composite Separator According to an Example Embodiment

A composite separator was prepared in the same manner as in Example 1, except that a porous coating film forming composition including about 10 wt % of MM9020 and about 90 wt % of DMF was used.

EXAMPLE 6

Preparation of Composite Separator According to an Example Embodiment

A composite separator was prepared in the same manner as in Example 1, except that a porous coating film forming composition including about 30 wt % of MM9020 and about 70 wt % of DMF was used.

EXAMPLE 7

Preparation of Composite Separator According to an Example Embodiment

A composite separator was prepared in the same manner as in Example 1, except that polyurethane having a mixing weight ratio of stationary phase segment to reversible phase segment of about 76:35 was used, instead of MS5520, to prepare a porous coating film composition.

COMPARATIVE EXAMPLE 1

Separator

A PET nonwoven fabric (having a thickness of about 18 μm and an air permeability of about 210 cc/cm$^2$·sec) as a polyester nonwoven fabric having heat-resistant temperature of about 200° C. or greater was used as a separator.

COMPARATIVE EXAMPLE 2

Separator

A polyethylene (PE) woven fabric (having a thickness of about 14 μm) (biaxially stretchable, available from Toray) was used as a separator.

COMPARATIVE EXAMPLE 3

Preparation of Composite Separator

A composite separator was prepared in the same manner as in Example 1, except that polyurethane (having a mixing weight ratio of stationary phase segment to reversible phase segment of about 27:73) was used instead of polyurethane (having a mixing weight ratio of stationary phase segment to reversible phase segment of about 77:23).

EVALUATION EXAMPLE 1

Scanning Electron Microscope (SEM) Analysis

Figure 2A:
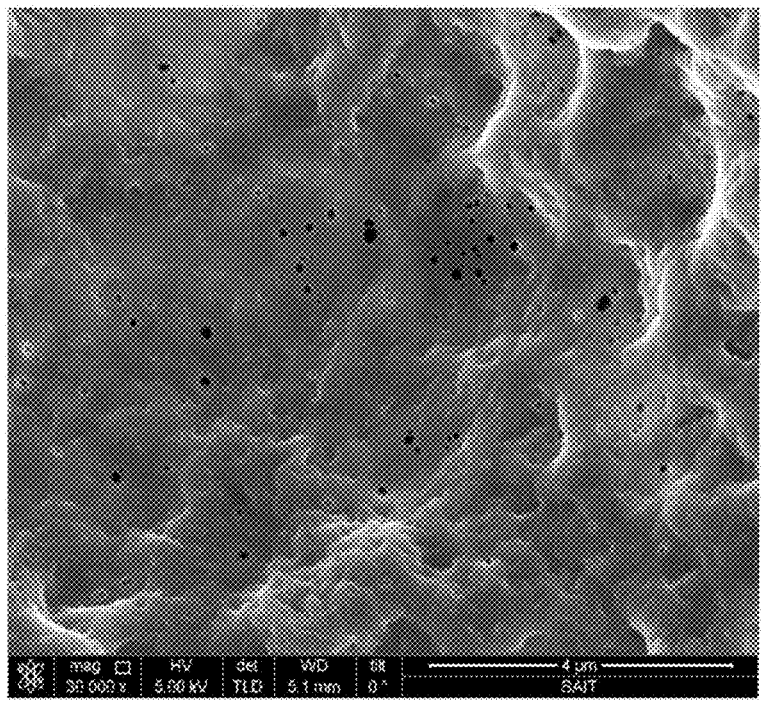
FIGS. 2A and 2B are surface and cross-sectional images of an example composite separator obtained by scanning electron microscopy (SEM)
Figure 2B:
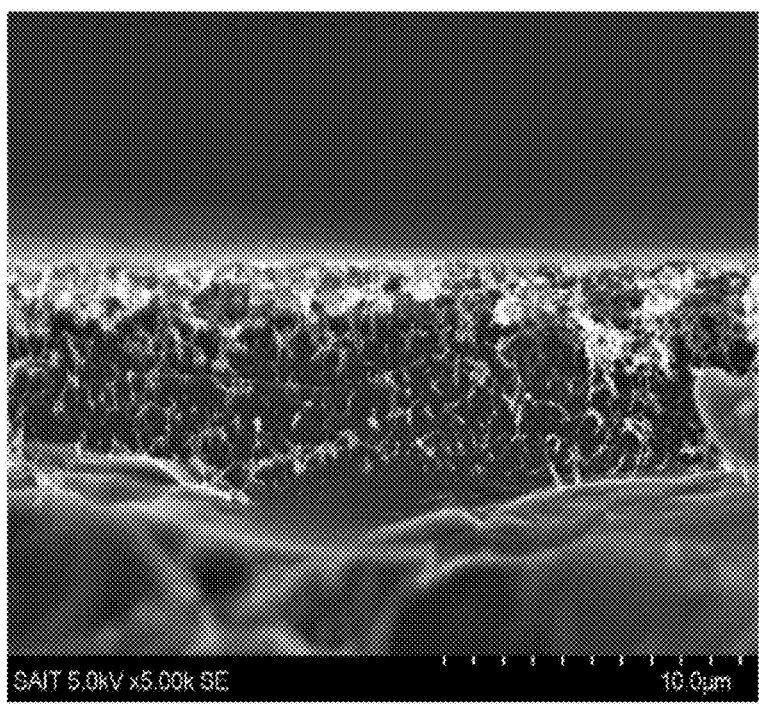
Figure 3A:
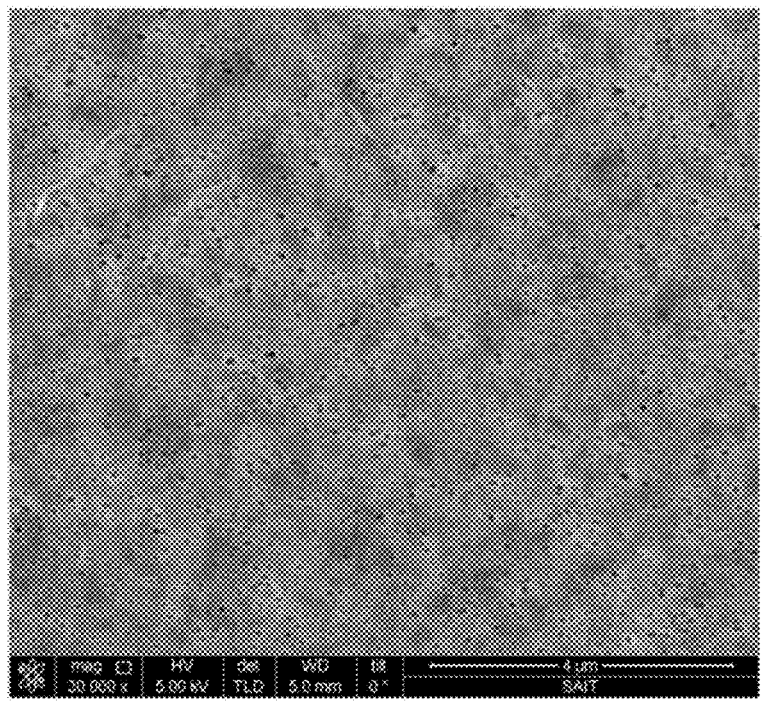
FIGS. 3A and 3B are surface and cross-sectional images of a composite separator obtained by SEM.
Figure 3B:
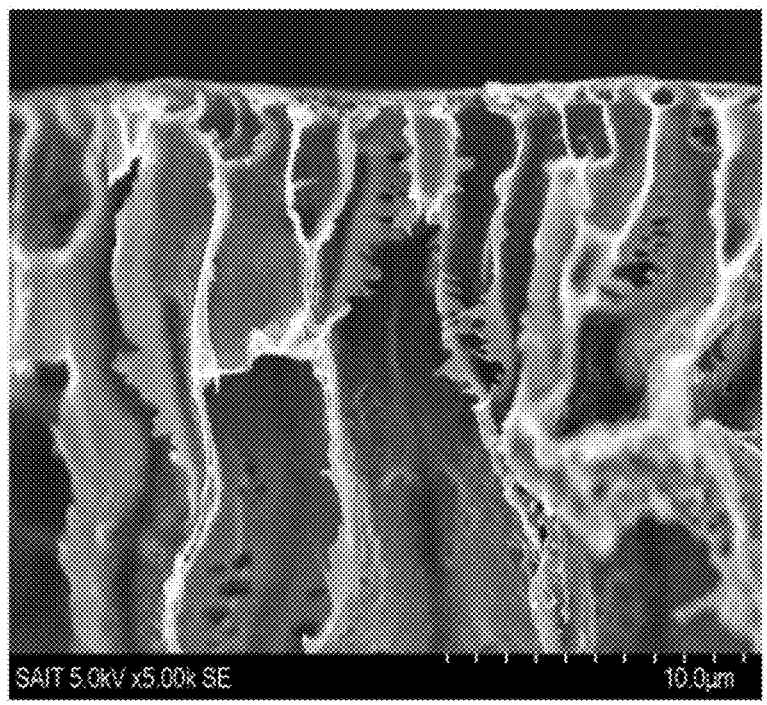

Cross-sections and surfaces of the composite separators of Examples 1 to 2 and the separators of Comparative Examples 1 and 2 were analyzed using a scanning electron microscope (NovaNano SEM 450, available from FEI). SEM images of the surface and cross-section of the composite separator of Example 1 are shown in FIGS. 2A and 2B, respectively. SEM images of the surface and cross-section of the composite separator of Example 2 are shown in FIGS. 3A and 3B, respectively. SEM images of the surfaces of the polyester nonwoven fabric separator of Comparative Example 1 and the polyethylene (PE) separator of Comparative Example 2 are shown in FIGS. 4A and 4B, respectively.

Referring to FIGS. 2A and 2B, The composite separator of Example 1 was found to include pores on the surface of the porous coating film and have a sponge-like shape as shown in the cross-sectional image. Referring to FIGS. 3A and 3B, the composite separator of Example 2 was found to have uniform pores on the surface thereof and a finger-like shape as shown in the cross-sectional image.

Figure 4A:
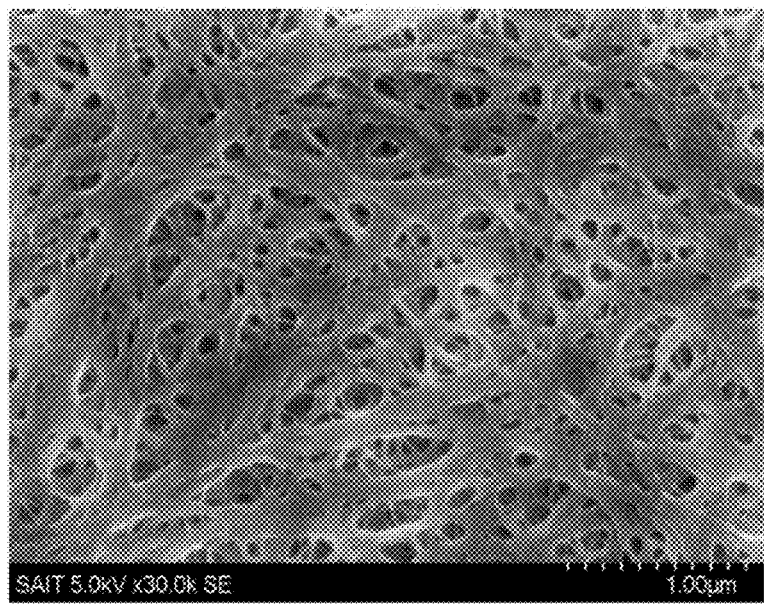
FIGS. 4A and 4B are surface images of a polyester nonwoven fabric separator obtained by SEM.
Figure 4B:
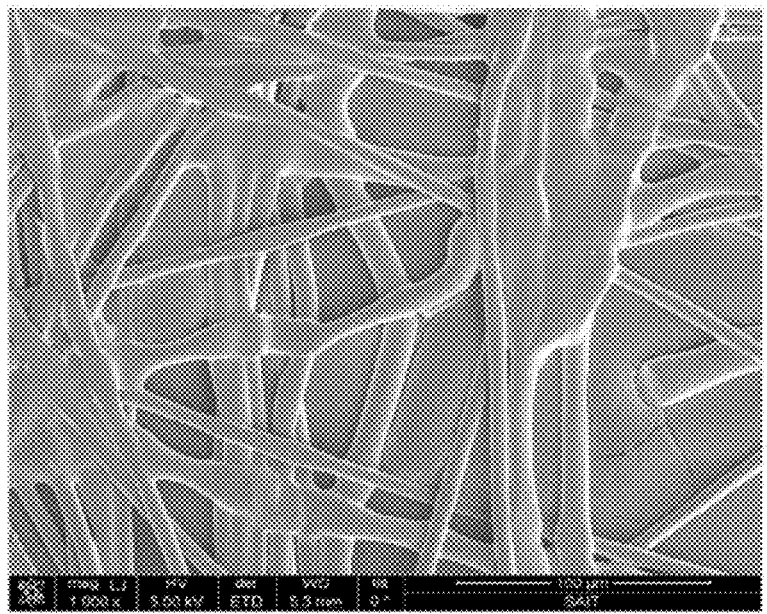

However, referring to FIGS. 4A and 4B, the separators of Comparative Examples 1 and 2 both were found to have a different surface structure from the surface structures of the composite separators of Examples 1 and 2.

EVALUATION EXAMPLE 2

Dynamic Mechanical Analysis (DMA)

Storage moduli of the composite separators of Examples 1 and 2 and the separators of Comparative Examples 1 and 2 were evaluated by dynamic mechanical analysis (DMA) using a RSA-G2 dynamic mechanical analyzer (available from TA instrument).

Figure 5A:
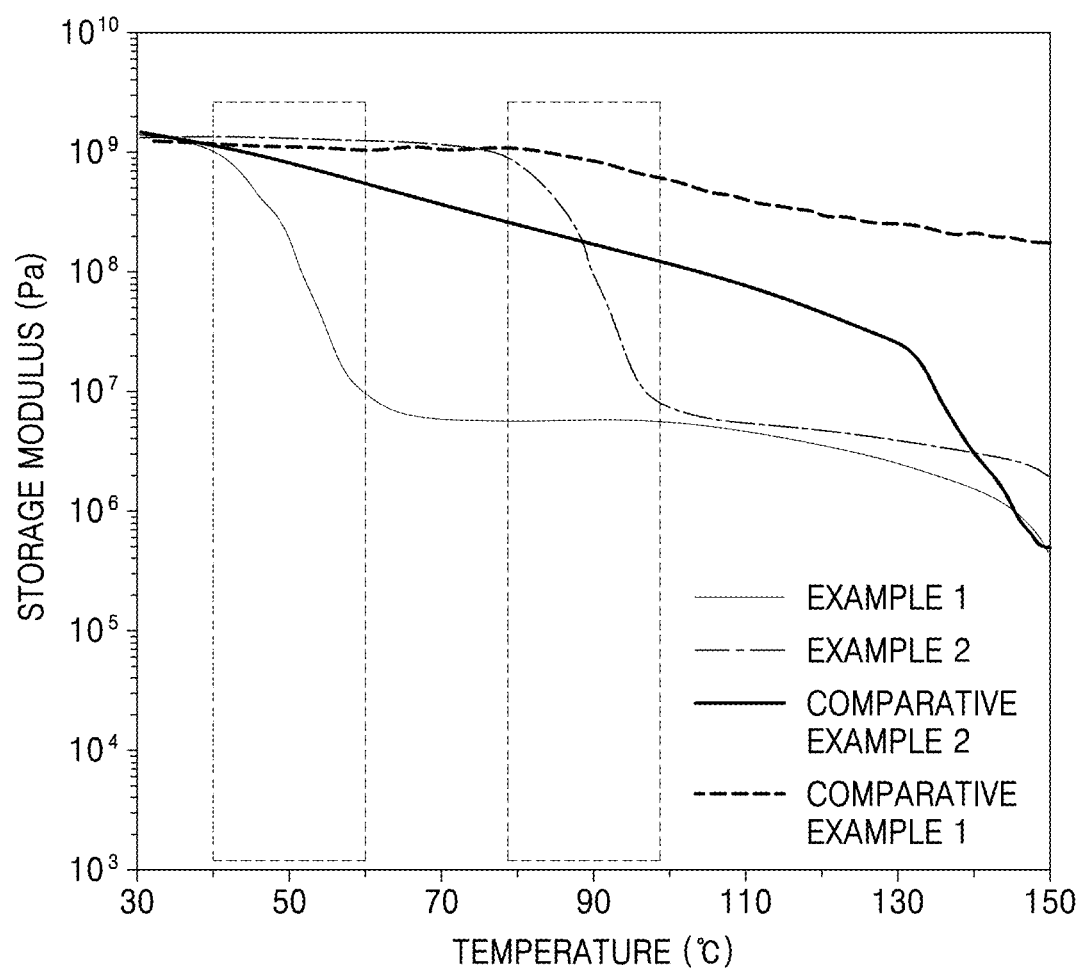
FIG. 5A is a graph showing results of storage modulus evaluation of the composite separators of example embodiments and the separators of comparative examples.

Storage modulus evaluation results of the composite separators of Examples 1 and 2 and the separators of Comparative Examples 1 and 2 are shown in FIG. 5A.

Referring to FIG. 5A, with rising temperatures, the PE separator of Comparative Example 2 (Tg: low temperature or room temperature) and the polyester separator of Comparative Example 1 (Tg: 105° C.) exhibited continuous reductions in phase transition of the polymer film, and no distinct modulus, while the composite separators coated with the multi-phase polymer exhibited a distinct range of transition temperatures and a sharp reduction in modulus. These results indicate that the composite separators of Examples 1 and 2 had, at transition temperatures, a rapid shutdown rate due to a high resistance increase slope required for the shutdown function.

Figure 5B:
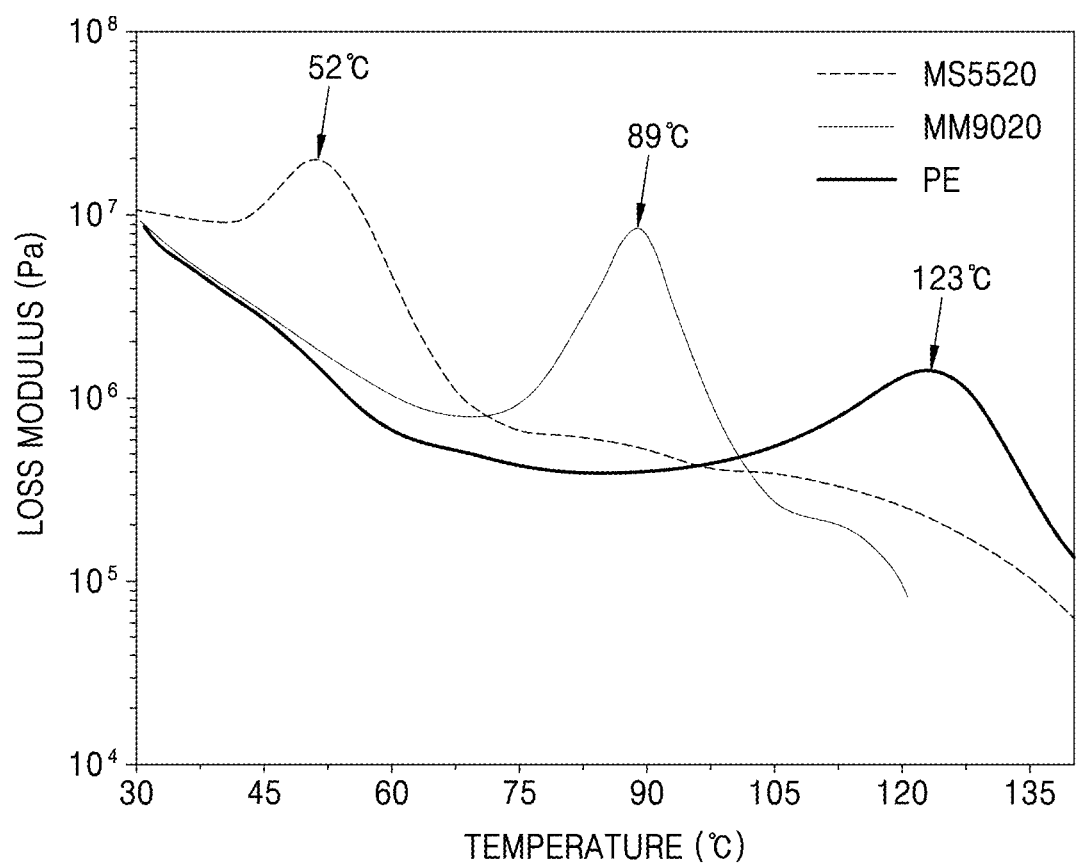
FIG. 5B is a graph showing results of dynamic mechanical analysis (DMA) of composite separators (including MS5520 and MM9020, respectively) and of a PE separator.

FIG. 5B shows DMA results of the composite separators of Examples 1 and 2 and the PE separator of Comparative Example 2. Referring to FIG. 5B, it was found that MS5520 used to prepare the composite separator of Example 1 had a glass transition temperature of about 52° C., MM9020 used to prepare the composite separator of Example 2 had a glass transition temperature of about 89° C., and the PE used to prepare the separator of Comparative Example 2 had a glass transition temperature of about 123° C.

DMA was also performed on the composite separators of Example 1 and Comparative Example 3.

According to results of the DMA, the composite separator of Example 1 was found to have improved loss modulus characteristics compared to the composite separator of Comparative Example 3.

EVALUATION EXAMPLE 3

Differential Scanning Calorimetry

The composite separators of Examples 1 and 2 and the separators of Comparative Examples 1 and 2 were analyzed by differential scanning calorimetry (DSC) using a Discovery DSC Q2000 (available from TA Instruments).

Figure 6A:
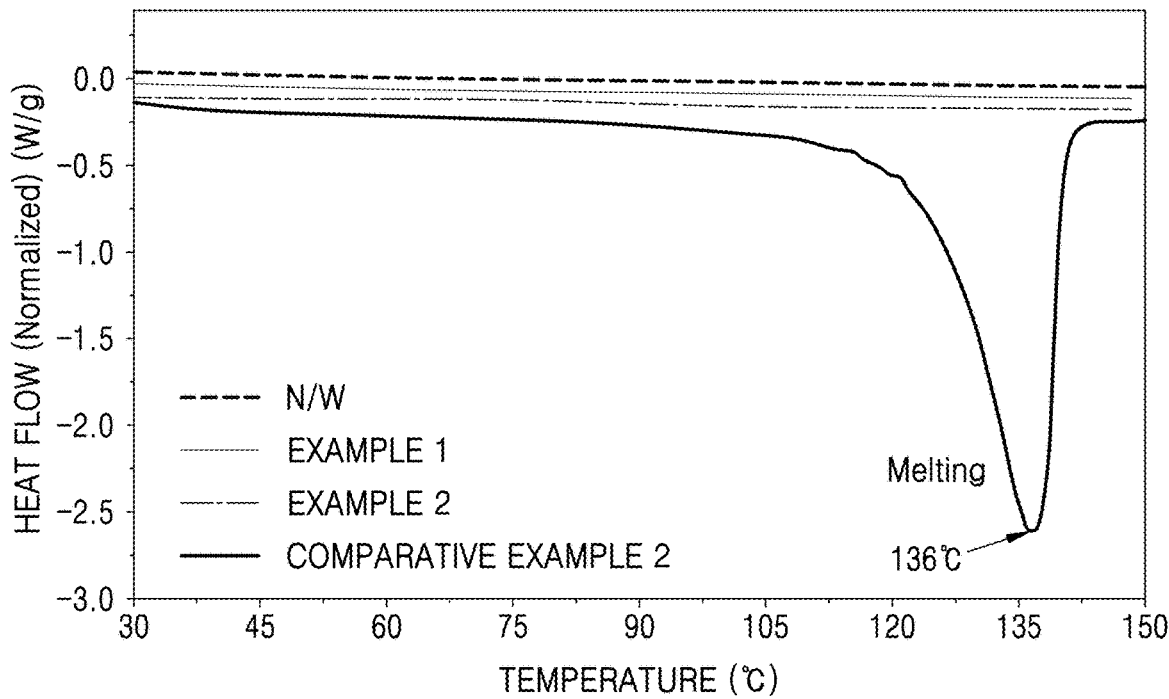
FIG. 6A is a graph showing results of differential scanning calorimetry (DSC) of the composite separators of example embodiments and the separators of comparative examples.
Figure 6B:
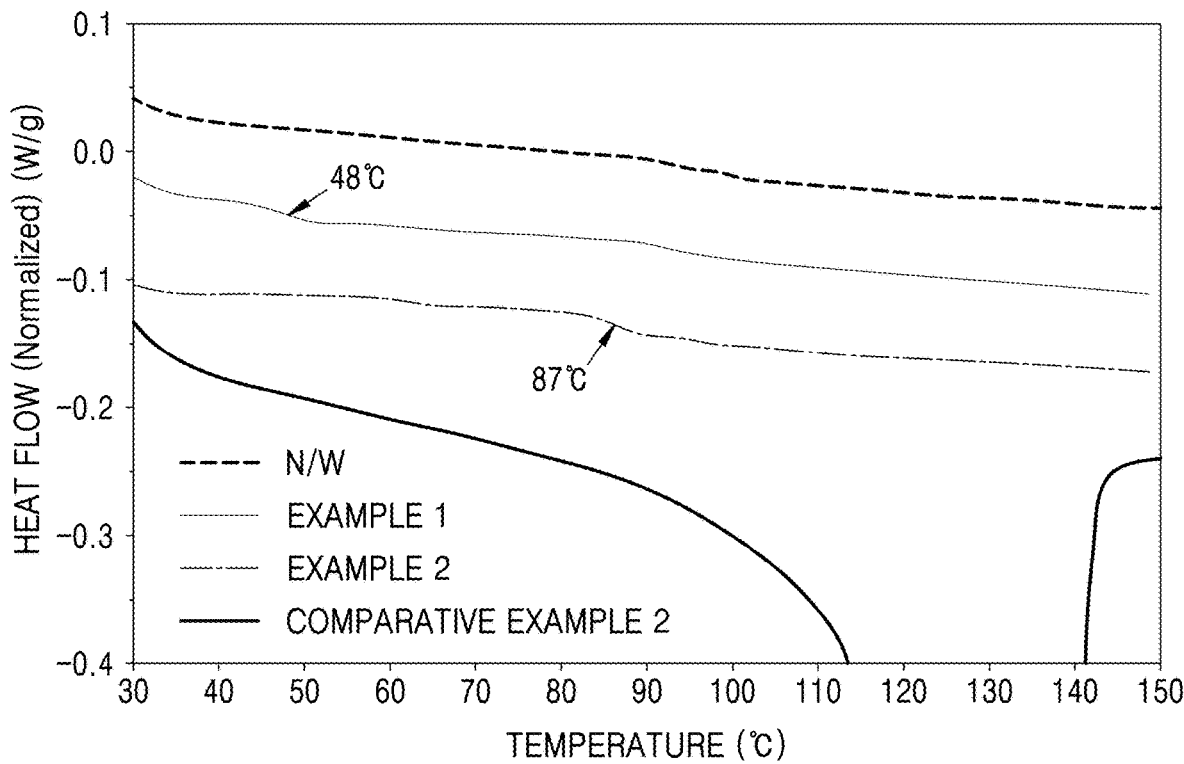
FIG. 6B is an enlarged graph of a dotted region in FIG. 6A.
Figure 6C:
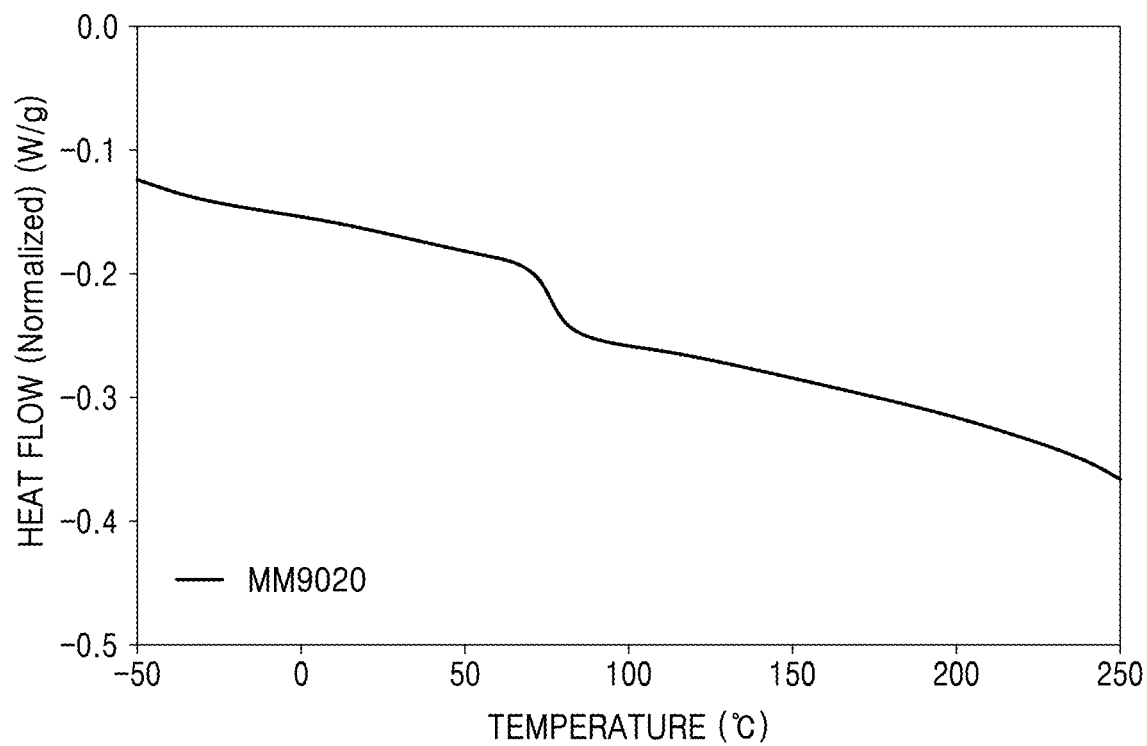
FIG. 6C is a graph showing the DSC results of the composite separator of an example embodiment over a wider temperature range than the temperature range shown in FIG. 6A.

DSC analysis results are shown in FIGS. 6A to 6C. FIG. 6A shows the DSC results of the composite separators of Examples 1 and 2 and the separators of Comparative Examples 1 and 2. FIG. 6B is an enlarged graph of a region in FIG. 6A. FIG. 6C is a graph showing DSC results of the composite separator of Example 2 including MM9020 in a wider temperature range than the temperature range shown in FIG. 6A. In FIGS. 6A and 6B, N/W denotes the results of the separator of Comparative Example 1.

The glass transition temperature (Tg) and the melting temperature (Tm) may be determined based on endothermic changes from the energy absorption of a sample measured using a differential scanning calorimeter (DSC). Referring to FIGS. 6A and 6B, the PE underwent a distinct endothermic reaction at a melting temperature (Tm) of about 130° C., while the composite separators coated with the multi-phase polymers did not exhibit a distinct transition interval of each or at least one polymer, unlike in the above-described DMA results, but exhibited a glass transition temperature (Tg) without any entropy change through the interval from Tg to 250° C., as shown in FIG. 6C. These results indicate that the composite separators of Examples 1 and 2 maintained stability even up to about 250° C. without a distinct change, ensuring safety at high temperatures. In view of membrane integrity at a meltdown temperature required for a battery separator, the stationary phase segment of the multi-phase polymer including the soft and stationary phase segments, which serves as a crosslinking site in the multi-phase polymer, took part in maintaining the shape of the separator consistent, together with the nonwoven fabric.

The glass transition temperature (Tg) of each polyurethane was determined by measuring a storage modulus thereof. Aa peak of the PE at about 123° C. is a melting temperature (Tm), not a glass transition temperature Tg.

EVALUATION EXAMPLE 4

Resistance Measurement

Figure 7:
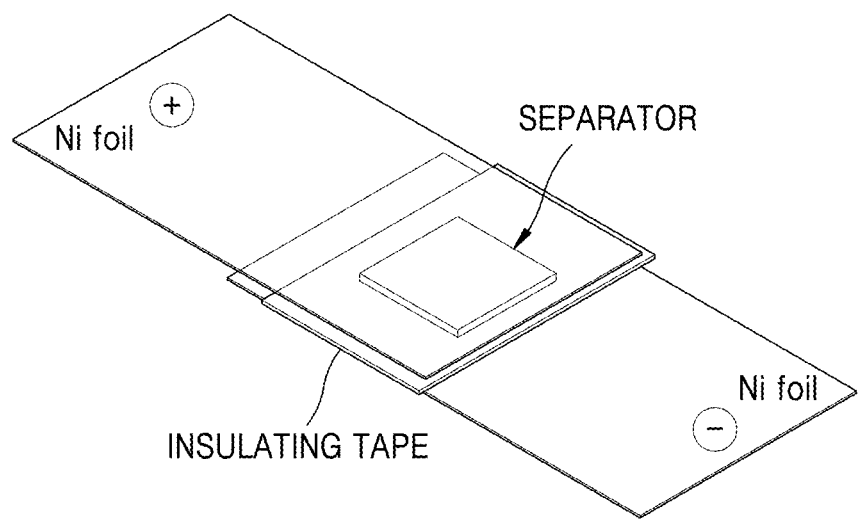
FIG. 7 is a schematic view illustrating a structure of a thin-film-type battery used to determine electrical characteristics of the composite separators of example embodiments and the separators of comparative examples.

The composite separators of Examples 1 and 2 and the separators of Comparative Examples 1 and 2 were each mounted onto equipment having a structure as illustrated in FIG. 7 to measure impedance. A solution of 1.15 M $LiPF_6$ in propyl propionate ($C_6H_{12}O_2$) was used as an electrolyte.

To measure electrical characteristics of the composite separators of Examples 1 and 2 and the separators of Comparative Examples 1 and 2, a thin film type battery was manufactured by disposing each separator on a nickel electrode (see FIG. 7). 0.5 ml of the solution of 1.15M $LiPF_6$ in propyl propionate ($C_6H_{12}O_2$) was added as electrolyte, and the battery was then stabilized at about 150° C. for about 3 seconds before use. The battery was connected to a potentiostat (IVIUMSTAT, available from Ivium Technologies) using lead wires, and then resistance of each sample was measured using an alternating current impedance method.

Figure 8:
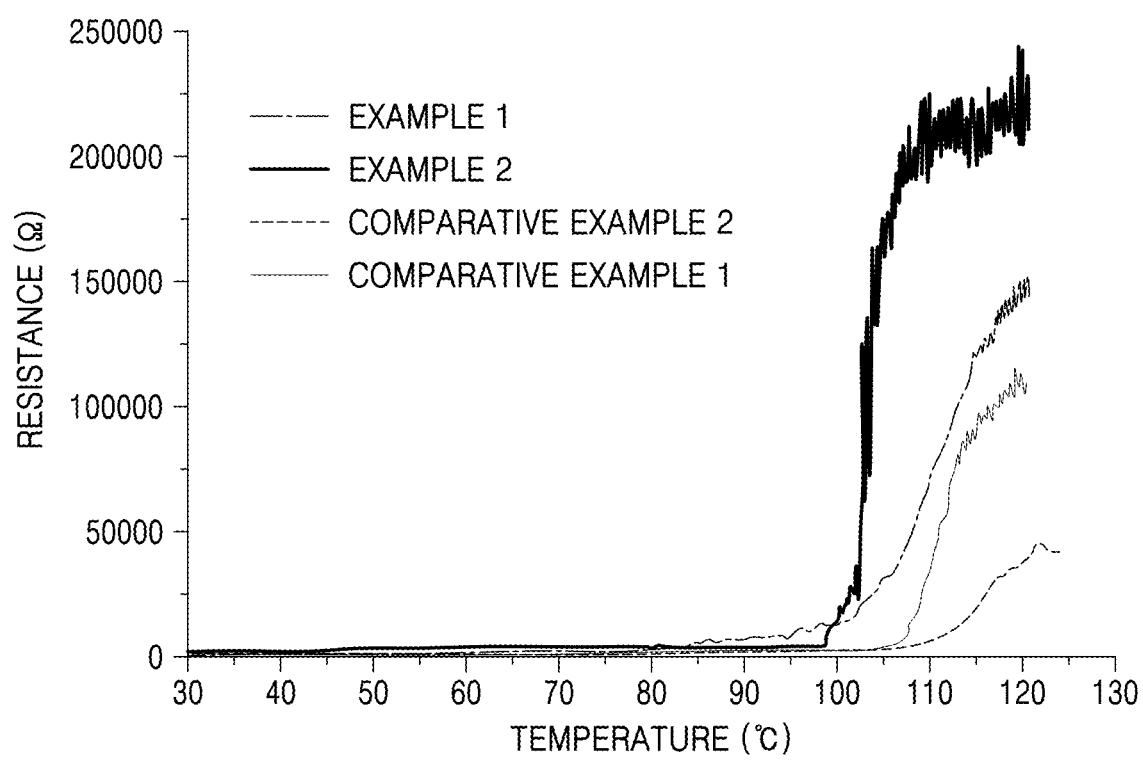
FIG. 8 is a graph of resistance characteristics of the composite separators of example embodiments and the separators of comparative examples.

The results of the resistance measurement are shown in FIG. 8.

Referring to FIG. 8, the polyester nonwoven fabric separator of Comparative Example 1 and the PE (woven fabric) separator of Comparative Example 2 were found to undergo no resistance change at a temperature lower than 105° C., while the composite separators of Examples 1 and 2 exhibited resistance changes near the glass transition temperature (Tg), indicating that they are configured to have the shutdown function. In particular, the composite separator of Example 2 had a rapidly increased resistance compared to the composite separator of Example 1. A resistance increase at temperatures higher than 110° C. in each sample was due to the boiling point of the solvent used in the electrolyte.

EVALUATION EXAMPLE 5

Atomic Force Microscopy (AFM) Measurement

To determine the shutdown function of the composite separators of Examples 1 and 2, morphological changes in the composite separators of Examples 1 and 2 and the PE separator of Comparative Example 2 were evaluated by using an atomic force microscope (iCON, available from Bruker) to observe changes in pores with respect to temperatures.

Figure 9A:
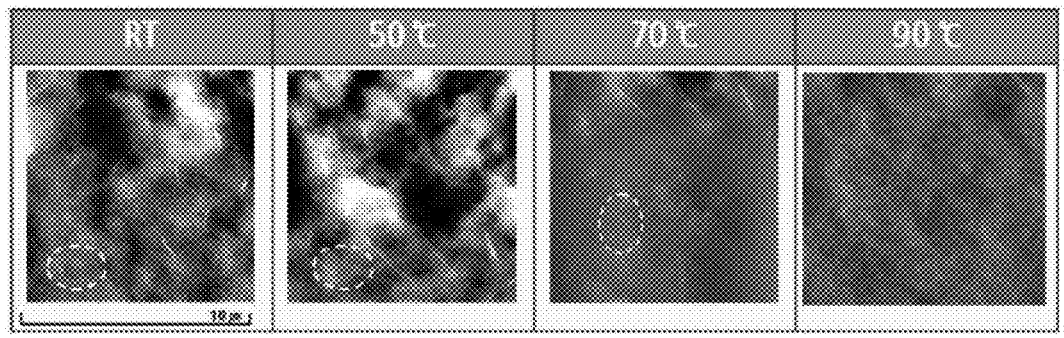
FIGS. 9A, 9B and 9C are images obtained by atomic force microscopy (AFM) of the composite separators of example embodiments and the PE separator of comparative examples.
Figure 9B:
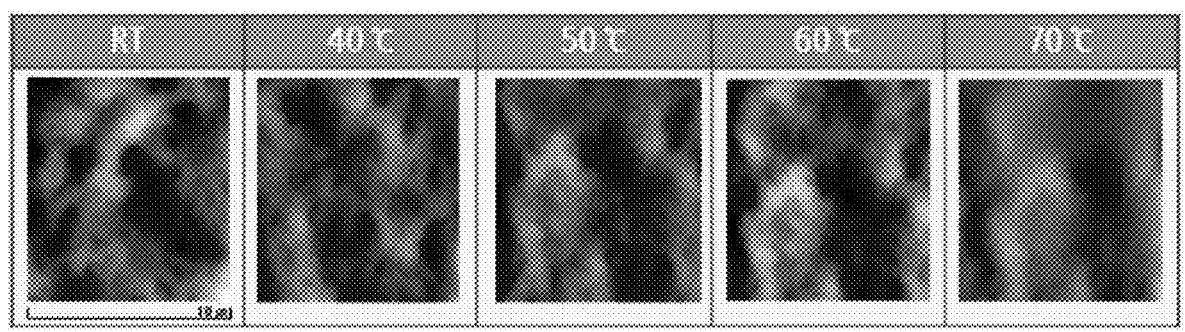
Figure 9C:
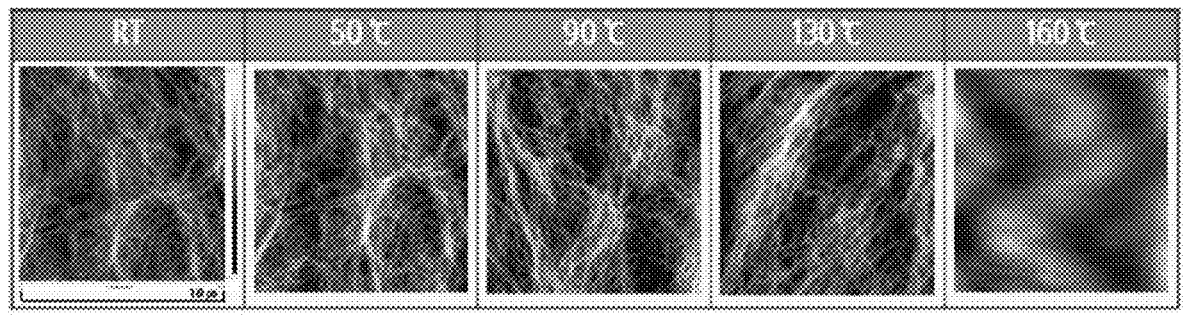

The AFM analysis results of the composite separators of Examples 1 and 2 and the PE separator of Comparative Example 2 are as shown in FIGS. 9A to 9C, respectively.

Referring to FIG. 9C, it was found that the PE separator of Comparative Example 2 melted at a temperature higher than the melting temperature (Tm) of about 130° C. The PE separator of Comparative Example 2 exhibited the shutdown function by being melted, thus more likely causing rupture or partial short circuit.

Referring to FIG. 9A, the composite separator of Example 1 was found to exhibit shutting down of pores at a temperature higher than 70° C. Referring to FIG. 9B, in the composite separator of Example 2, shutting down of pores occurred at a temperature higher than 90° C.

EVALUATION EXAMPLE 6

Air Permeability

Air permeabilities of the composite separators of Examples 1 and 2 and the separators of Comparative Examples 1 and 2 were measured using an air-permeability measuring apparatus. The air permeability was measured as the time in seconds it took for 100 cc of air to pass through.

The air permeability measurement results are shown in Table 1.

TABLE 1

| Example | Air permeability (sec/100 cc) |
| --- | --- |
| Example 1 | 8 |
| Example 2 | 8 |
| Comparative Example 1 | 0 |
| Comparative Example 2 | 100-150 |

Referring to Table 1, the polyester (PET) nonwoven fabric separator of Comparative Example 1 was found to have nearly zero resistance while air passed through. The composite separators of Examples 1 and 2 were found to have reduced resistance against air passing therethrough, compared to the PE separator of Comparative Example 2.

EVALUATION EXAMPLE 7

Ion Conductivity

The composite separator of Example 2 and the separators of Comparative Examples 1 and 2 were each between two electrodes (steel use stainless (SUS)), and then an alternating current was applied across the two electrodes to analyze responses of the separator with an impedance analyzer (IM6, available from Zahner), thereby measuring ion conductivity at about 60° C. The results of the ion conductivity measurement are shown in Table 2.

TABLE 2

| Example | Ion conductivity (S/cm) |
|---|---|
| Example 2 | $4.93 \times 10^{-4}$ |
| Comparative Example 1 | $5.11 \times 10^{-4}$ |
| Comparative Example 2 | $4.42 \times 10^{-4}$ |

Referring to Table 2, the composite separator of Example 2 were found to have a higher ion conductivity that the ion conductivity of the PE separator of Comparative Example 2. This result indicates that the composite separator of Example 2 may ensure smooth migration of lithium ions through pores of the separator during charging and discharging.

As described above, according to the one or more example embodiments, using a composite separator according to any of the example embodiments, a secondary battery having a high or increased capacity may have improved stability against heat.

While one or more example embodiments have been described with reference to the figures, it will be understood by those of ordinary skill in the art that various changes in form and details may be made therein without departing from the spirit and scope as defined by the following claims.

What is claimed is:

1. A composite separator comprising:
a heat-resistant nonwoven fabric; and
a porous coating film on at least one surface of the heat-resistant nonwoven fabric, the porous coating film including a multi-phase polymer including a stationary phase segment and a reversible phase segment,
wherein an amount of the stationary phase segment is larger than an amount of the reversible phase segment, and
wherein the reversible phase segment is configured to undergo a reversible phase change such that the multi-phase polymer has shape-memory characteristics,
wherein the porous coating film is configured to reversibly increase the resistance of the composite separator.

2. The composite separator of claim 1, wherein the porous coating film comprises the multi-phase polymer without a binder.

3. The composite separator of claim 1, wherein the porous coating film is obtained by coating, on the heat-resistant nonwoven fabric, a composition for forming the porous coating film, the composition including the multi-phase polymer and a solvent, and dipping a resulting coated product in a non-solvent to induce phase transition.

4. The composite separator of claim 1, wherein the multi-phase polymer comprises at least one selected from a polymethyl methacrylate-polybutylene methacrylate copolymer, a fish oil polymer, a soybean oil-styrene-divinylbenzene copolymer, and shape-memory polyurethane.

5. The composite separator of claim 1, wherein the amount of the stationary phase segment in the multi-phase polymer is about 70 wt % to about 85 wt % based on a combined weight of the stationary phase segment and the reversible phase segment.

6. The composite separator of claim 1, wherein an amount of the multi-phase polymer is about 10 wt % to about 30 wt % based on a combined weight of the composite separator.

7. The composite separator of claim 1, wherein the multi-phase polymer has a glass transition temperature of about 50° C. or greater.

8. The composite separator of claim 1, wherein the multi-phase polymer is an ether-based polyurethane having a glass transition temperature of about 55° C. to about 150° C.

9. The composite separator of claim 1, wherein the multi-phase polymer is obtained by adding a chain extender to a reaction product of bifunctional aromatic diisocyanate and bifunctional polyol, and reacting the chain extender with the reaction product.

10. The composite separator of claim 9, wherein an amount of the bifunctional aromatic diisocyanate is about 1.1 moles to about 5.0 moles with respect to 1 mole of the bifunctional polyol, and
an amount of the chain extender is about 0.01 moles to about 4.0 moles with respect to 1 mole of the bifunctional polyol.

11. The composite separator of claim 9, wherein
the bifunctional aromatic diisocyanate includes at least one selected from diphenylmethane-4,4'-diisocyanate, 2,4-toluene diisocyanate, and carbodiimide-modified diphenylmethane-4,4-diisocyanate,
the bifunctional polyol includes at least one selected from glycerol, polypropylene glycol, 1,4-butane glycol adipate, polytetramethylene glycol, ethylene glycol, polyethylene glycol, and a propylene oxide adduct of bisphenol A, and
the chain extender includes at least one selected from ethylene glycol, 1,4-butanediol, bis(2-hydroxyethyl) hydroquinone, an ethylene oxide adduct of bisphenol A, and a Bisphenol A-propylene oxide adduct.

12. The composite separator of claim 1, wherein the multi-phase polymer is i) a polyurethane based on diphenylmethane-4,4'-diisocyanate, adipic acid, ethylene glycol, ethylene oxide, polypropylene oxide, 1,4-butanediol, and Bisphenol A; or ii) a polyurethane based on methylene diphenyl isocyanate and polyol.

13. The composite separator of claim 1, wherein the heat-resistant nonwoven fabric has an air permeability of about 50 cc/cm$^2$·sec to about 250 cc/cm$^2$·sec, and a thickness of about 10 μm to about 25 μm.

14. The composite separator of claim 1, wherein the heat-resistant nonwoven fabric comprises at least one selected from polyester, polyetherimide, polyethylene, polypropylene, polyethylene terephthalate, polybutylene terephthalate, polyamide, polyacetal, polycarbonate, polyimide, polyether ketone, polyethersulfone, polyphenylene oxide, polyphenylene sulfide, polyethylene naphthalene, polytetrafluoroethylene, polyfluorinated vinylidene, polyvinyl chloride, polyacrylonitrile, cellulose, nylon, polyparaphenylene benzobisoxazole, polyarylate, and glass.

15. The composite separator of claim 1, wherein the composite separator has a storage modulus slope of about 30 MPa/° C. or greater, as measured by dynamic mechanical analysis (DMA) at a temperature of about 100° C. or less.

16. The composite separator of claim 1, wherein the composite separator has a pore shutdown temperature of about 70° C. to about 150° C. and a meltdown temperature of about 200° C. to about 300° C.

17. The composite separator of claim 1, wherein the porous coating film has a thickness of about 5 μm to about 30 μm.

18. The composite separator of claim 1, wherein the composite separator has a porosity of about 25% to about 60% and an air permeability of about 1 sec/100 cc to about 100 sec/100 cc.

19. The composite separator of claim 1, wherein the multi-phase polymer has a weight average molecular weight of about 5,000 Daltons to about 300,000 Daltons.

20. A secondary battery comprising:
- a positive electrode,
- a negative electrode, and
- the composite separator of claim 1 between the positive electrode and the negative electrode.

* * * * *